W. A. GORDON.
MACHINE FOR REFINING RUBBER.
APPLICATION FILED OCT. 1, 1919.
1,364,549.
Patented Jan. 4, 1921.
3 SHEETS—SHEET 1.
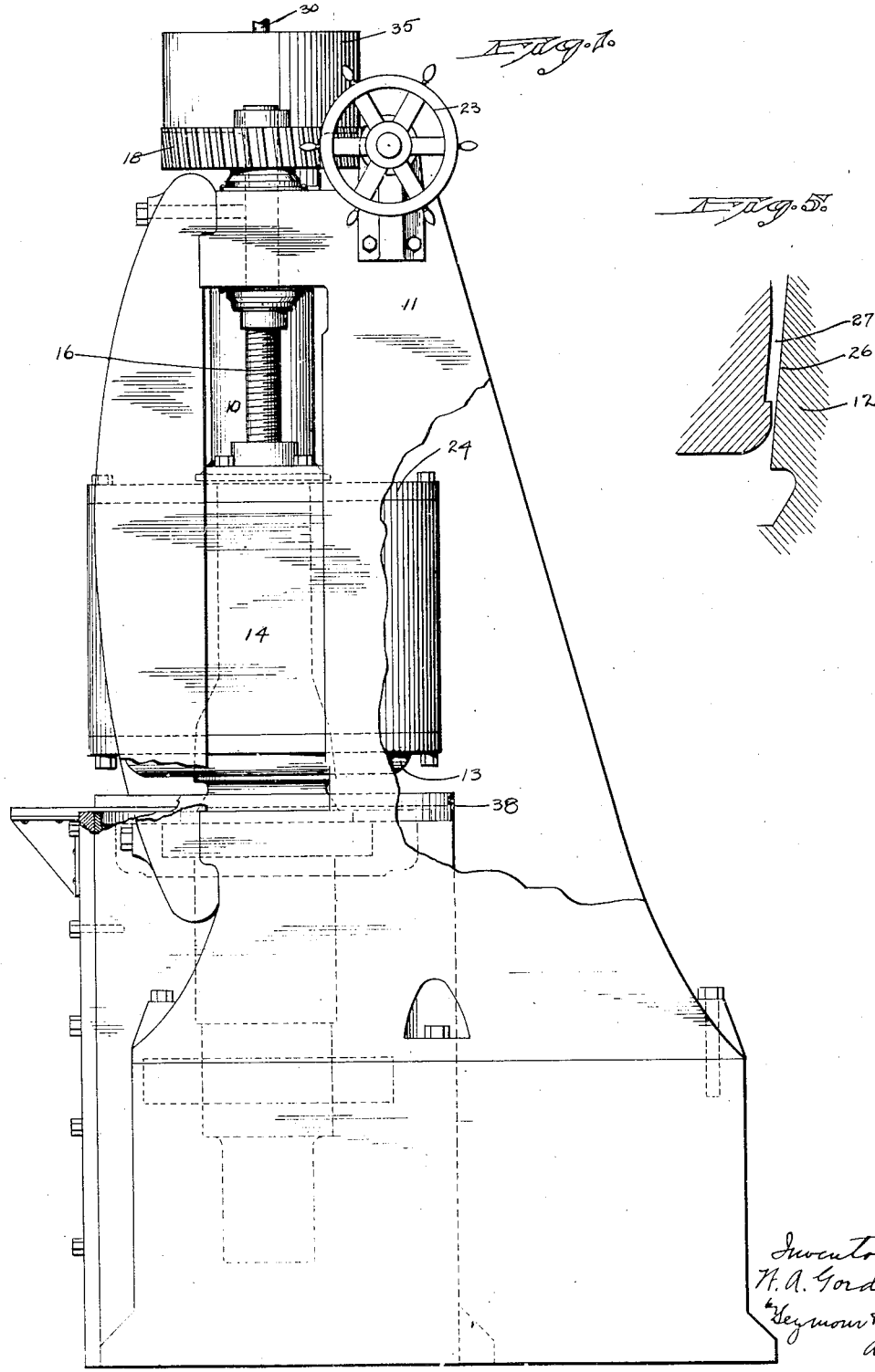

W. A. GORDON.
MACHINE FOR REFINING RUBBER.
APPLICATION FILED OCT. 1, 1919.
1,364,549.
Patented Jan. 4, 1921.
3 SHEETS—SHEET 2.
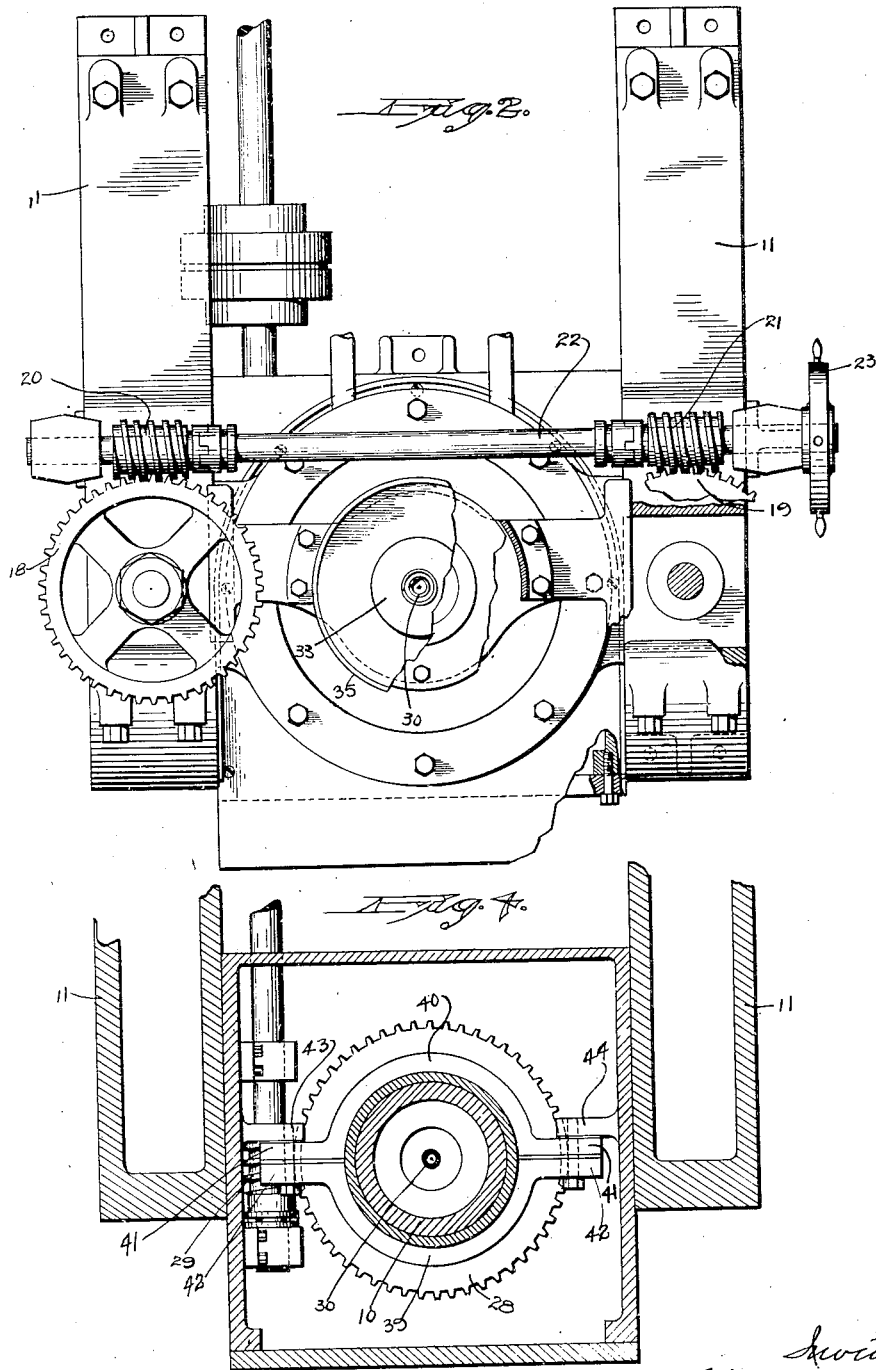

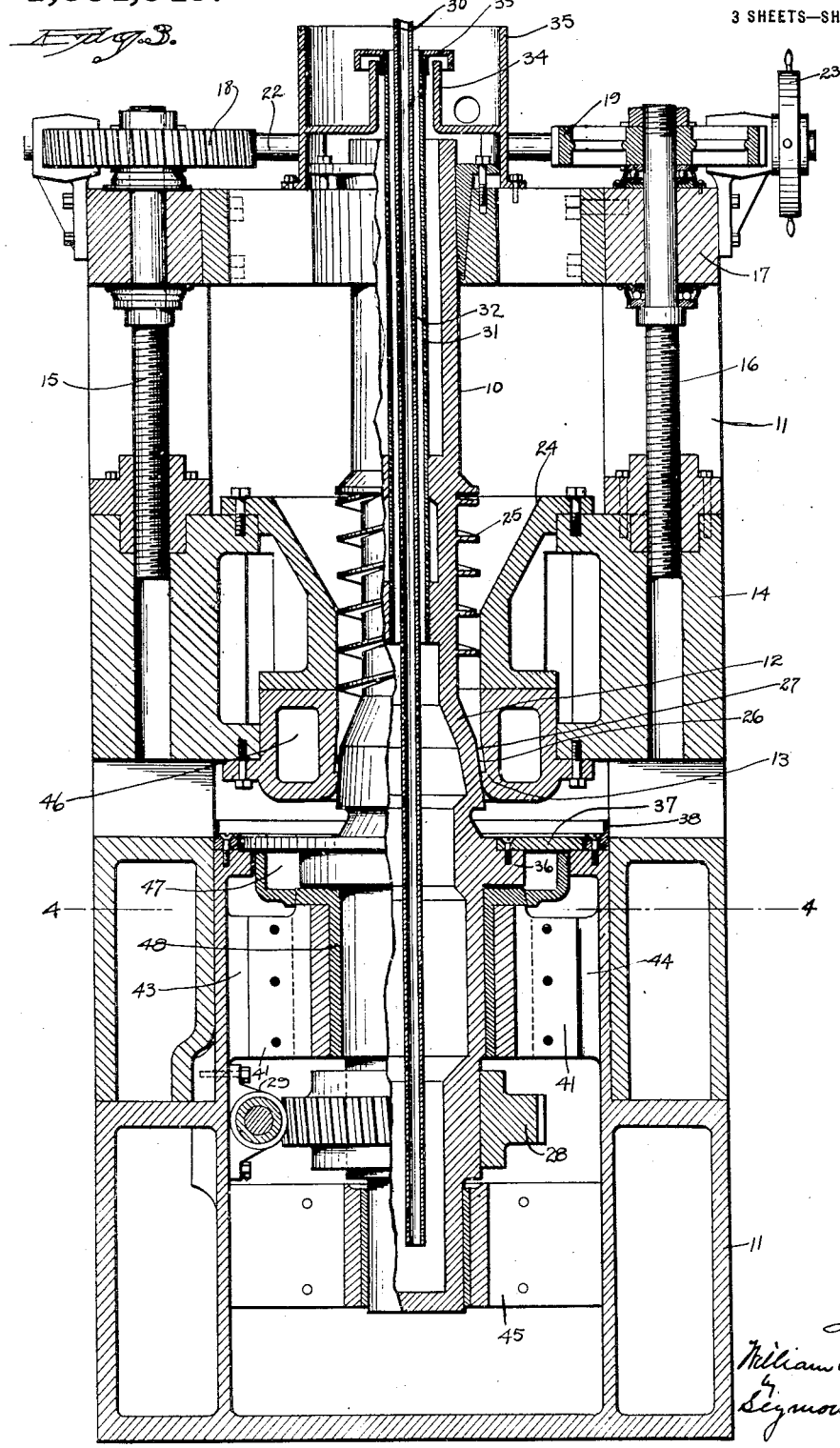

UNITED STATES PATENT OFFICE.

WILLIAM A. GORDON, OF DERBY, CONNECTICUT, ASSIGNOR TO BIRMINGHAM IRON FOUNDRY, OF DERBY, CONNECTICUT, A CORPORATION.

MACHINE FOR REFINING RUBBER.

1,364,549. Specification of Letters Patent. Patented Jan. 4, 1921.

Application filed October 1, 1919. Serial No. 327,757.

*To all whom it may concern:*

Be it known that I, WILLIAM A. GORDON, a citizen of the United States, residing at Derby, in the county of New Haven and State of Connecticut, have invented a new and useful Improvement in Machines for Refining Rubber; and I do hereby declare the following, when taken in connection with the accompanying drawings and the characters of reference marked thereon, to be a full, clear, and exact description of the same, and which said drawings constitute part of this application, and represent, in—

Figure 1 a side view partly in section of a machine for refining rubber constructed in accordance with my invention.

Fig. 2 a top or plan view of the same.

Fig. 3 a vertical sectional view of the same.

Fig. 4 a sectional view on the line 4—4 of Fig. 3.

Fig. 5 an enlarged sectional view of a portion of the spindle and die showing the spindle groove formed in the die.

This invention relates to an improvement in machine for refining rubber. In the more general construction of machines for this purpose, two rolls are arranged parallel with each other and crowded with their surfaces running close together and between which material to be refined is passed. In practice there is a limit to the length of the rolls which may be employed for this purpose owing to the pressure which is placed upon them.

The object of this invention is to produce a machine which will provide for a larger working surface in proportion to its size than rolls and which will obviate the difficulty of producing the necessary pressure upon the rolls, and the invention consists in the construction hereinafter described and particularly recited in the claims.

In carrying out my invention I employ a spindle 10 suitably mounted to be rotated in a frame 11 and formed with a working head 12 within a circular die 13 rigidly connected to a body 14 which is guided in the frame 11 and adapted to be moved vertically by screws 15 and 16 which project upward through a cross head 17 above which gears 18 and 19 are fixed to the screws 15 and 16 and adapted to be turned by worms 20 and 21 on a shaft 22 which may be turned by a hand-wheel 23 or otherwise, so that the body 14 may be raised or lowered. Fixed to this body 14 is a mouth or hopper 24, and on the spindle or connected with the spindle, is a feed-screw 25 working in the hopper and tending to force any material downward between the head 12 and die 13. The head 12 has tapered walls 26 so that it may have a close contact with the inner wall of the die 13 which, however, is formed with an annular safety groove 27 the inner wall of which is parallel to the inclined wall of the spindle for the purpose as will hereinafter appear. This spindle is driven by having a gear 28 fixed to it and meshing with the worm 29 driven from any convenient source of power. As herein shown, the spindle is hollow so that it may be filled with water admitted to a supply pipe 30 entering from the top and passing down through a tube 31 fixed in the spindle and forming a passage 32 between them through which water may pass and flow over a cap 33 secured to the tube 32 and extending over a sleeve 34 in the overflow tank 35. The spindle is formed with a thrust flange 36 and secured to this flange is a table 37 which travels with the spindle, being partly inclosed by a rail 38 for the purpose as will hereinafter appear. To provide for maintaining the central position of the spindle, it is supported within its lower end by semi-circular yokes 39 and 40 formed respectively with ears 41 and 42 which bear upon and are secured to lugs 43 and 44 projecting inward from the frame. The lower end of the spindle is also supported by a web 45. The die 13 may be provided with a water recess 46 and around the flange 36 will be an air space 47 from which oil may travel down between the bushing 48 on the spindle. Stock to be refined is placed in the hopper 24 and the spindle being driven the screw 25 will crowd the stock down between the die 13 and the head 12, and so that the working surface corresponds to the diameter of the head and the body 14 may be forced down so as to contract the opening between the die and head to the desired extent. It frequently happens that pieces of material, such as wire, nails, etc., are in the stock to be refined, and if these articles are forced downward by the feed screw, they will enter the groove 27 instead of being crowded down between the die and spindle and from which chamber they may be removed by raising the body 14 so as to lift the die away from the spindle. The material crowded between the die and the head on the spindle will fall onto the table 33 from which it may be removed in any convenient manner. With a machine thus constructed the die may be crowded against the spindle with much greater force than two rolls can be crowded together, and the extent of working surface is considerably in excess of what can be obtained by the use of parallel rolls and the space through which the material is forced may be maintained uniformly.

I claim:—

1. In a machine for refining rubber, the combination with a spindle formed with a head having an annular working surface, of a circular die through which the said head extends, and means for forcing material between the spindle and die, whereby material is worked between them.

2. In a machine for refining rubber, the combination with a rotary spindle, of an annular die in which the spindle turns, the spindle formed with a beveled working surface, and means for forcing material between the spindle and die.

3. A machine for refining rubber, a vertically arranged spindle formed with a working head, and means for driving the spindle, an annular die within which the spindle turns, means for adjusting the die vertically, and means for forcing material between the die and spindle whereby material is worked between them.

4. In a machine for refining rubber, the combination with a frame, of a vertically arranged spindle therein, said spindle formed with a working head, a feed screw, means for turning the said spindle, a vertically movable body carrying a die surrounding the said spindle, a cross head, screws mounted in the said cross head and extending into engagement with the said body, and means for turning said screws for adjusting the body vertically.

5. In a machine for refining rubber, the combination with a frame, of a vertically arranged spindle therein, said spindle formed with a working head, a feed screw, means for turning the said spindle, a vertically movable body carrying a die surrounding the said spindle, a cross head, screws mounted in the said cross head and extending into engagement with the said body, gears fixed to said screws, worms meshing with said gears, and means for turning said worms.

6. In a machine for refining rubber, the combination with a vertically arranged spindle and means for turning the same, said spindle formed with a working head having an inclined working surface, an annular fixed die around the working head of the spindle, said die formed with an annular groove adjacent to the working face of the spindle.

7. In a machine for refining rubber, the combination with a vertically arranged spindle and means for turning the same, said spindle formed with a working head having an inclined working surface, an annular fixed die around the working head of the spindle and a clearance groove between said die and spindle.

In testimony whereof I have signed this specification in the presence of two subscribing witnesses.

WILLIAM A. GORDON.

Witnesses:
MALCOLM P. NICHOLS,
J. HAROLD FLYNN.